United States Patent
Shibuya et al.

(10) Patent No.: US 8,949,115 B2
(45) Date of Patent: Feb. 3, 2015

(54) TERMINAL DEVICE, AUDIO OUTPUT METHOD, AND INFORMATION PROCESSING SYSTEM

(75) Inventors: Kiyoto Shibuya, Saitama (JP); Jin Nakamura, Tokyo (JP); Katsuhiko Shibata, Chiba (JP); Kazuhiro Yanase, Tokyo (JP); Akitoshi Yamaguchi, Saitama (JP); Akiyoshi Morita, Tokyo (JP); Kouichi Kazama, Saitama (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 431 days.

(21) Appl. No.: 13/496,504

(22) PCT Filed: Sep. 16, 2010

(86) PCT No.: PCT/JP2010/005670
§ 371 (c)(1),
(2), (4) Date: May 24, 2012

(87) PCT Pub. No.: WO2011/033780
PCT Pub. Date: Mar. 24, 2011

(65) Prior Publication Data
US 2012/0245929 A1    Sep. 27, 2012

(30) Foreign Application Priority Data
Sep. 18, 2009   (JP) ................. 2009-217883

(51) Int. Cl.
*G10L 21/00* (2013.01)
*H04J 3/06* (2006.01)
(Continued)

(52) U.S. Cl.
CPC *H04R 3/00* (2013.01); *A63F 13/02* (2013.01); *A63F 13/12* (2013.01); *H04J 3/062* (2013.01);
(Continued)

(58) Field of Classification Search
CPC ......... H04J 3/0632; H04J 3/062; G10L 19/00
USPC .......................................... 704/201; 370/516
See application file for complete search history.

(56) References Cited

U.S. PATENT DOCUMENTS 6,452,950 B1 *  9/2002  Ohlsson et al. ............... 370/516
8,363,673 B2    1/2013  Wang
(Continued)

FOREIGN PATENT DOCUMENTS

CN    101119323 A    2/2008
CN    101175104 A    5/2008
(Continued)

OTHER PUBLICATIONS

Office Action issued for corresponding Japanese Patent Application No. 2009-217883, dated Sep. 17, 2013.
(Continued)

*Primary Examiner* — Vincent P Harper
(74) *Attorney, Agent, or Firm* — Matthew B. Dernier, Esq.; Gibson & Dernier LLP (57) ABSTRACT

In an audio output terminal device, a buffer control unit adjusts the buffer size of a jitter buffer in accordance with the setting of a sound output mode instructed in an instruction receiving unit. If the instruction receiving unit acknowledges an instruction for setting an audio output mode that requires low delay in outputting sound, the buffer control unit reduces the buffer size of the jitter buffer. Further, the buffer control unit controls, in accordance with the instructed setting of the sound output mode, timing for allowing a media buffer to transmit one or more voice packets to the jitter buffer.

7 Claims, 6 Drawing Sheets

(51) Int. Cl.
  *H04R 3/00* (2006.01)
  *A63F 13/98* (2014.01)
  *A63F 13/30* (2014.01)
  *H04M 1/60* (2006.01)

(52) U.S. Cl.
  CPC ..... *A63F 2300/408* (2013.01); *A63F 2300/534* (2013.01); *A63F 2300/572* (2013.01); *A63F 2300/6081* (2013.01); *H04M 1/6066* (2013.01)
  USPC ......... 704/201; 704/211; 370/230.1; 370/252

(56) References Cited

U.S. PATENT DOCUMENTS

| | | | |
|---|---|---|---|
| 2002/0026310 A1 | 2/2002 | Mochida | |
| 2002/0101885 A1* | 8/2002 | Pogrebinsky et al. | 370/516 |
| 2005/0243729 A1* | 11/2005 | Jorgenson et al. | 370/241 |
| 2005/0278166 A1 | 12/2005 | Tajiri | |
| 2008/0049795 A1* | 2/2008 | Lakaniemi | 370/516 |
| 2008/0159384 A1* | 7/2008 | Civanlar et al. | 375/240.01 |
| 2010/0208605 A1 | 8/2010 | Wang | |

FOREIGN PATENT DOCUMENTS

| | | | |
|---|---|---|---|
| JP | 2002535885 A | | 10/2002 |
| JP | 2003124967 A | | 4/2003 |
| JP | 2003309541 A | | 10/2003 |
| JP | 2004048343 A | | 2/2004 |
| JP | 2006135793 A | | 5/2006 |
| JP | 2007-194991 | * | 7/2007 |
| JP | 2007194991 A | | 8/2007 |
| JP | 2009-089157 | * | 4/2009 |
| JP | 2009089157 A | | 4/2009 |

OTHER PUBLICATIONS

International Search Report for the corresponding PCT Application No. PCT/JP2010/005670, dated Dec. 14, 2010.

International Preliminary Report on Patentability and Written Opinion for the corresponding PCT Application No. PCT/JP2010/005670, dated Dec. 14, 2010.

Office Action issued for corresponding Chinese Patent Application No. 201080043672.0, dated Feb. 25, 2014.

* cited by examiner

TERMINAL DEVICE, AUDIO OUTPUT METHOD, AND INFORMATION PROCESSING SYSTEM

TECHNICAL FIELD

The present invention generally relates to terminal devices, and more particularly, to terminal devices for receiving a voice packet and outputting sound, and to systems comprising an audio output terminal device.

BACKGROUND ART

Short range wireless communication systems using the Bluetooth (registered trademark) protocol have been developed and put into practical use. In such a short range wireless communication system, electronics devices, such as a personal computer, a printer, a digital camera, or the like, are connected without using a cable. Recently, headsets using the Bluetooth protocol have been also developed. Wireless headsets eliminate the need of a cable that connects with an audio source. Therefore, in case that a user listens to music, etc, it is an advantage that the user is relieved of the inconvenience of tangled cables, or the like.

RELATED ART LIST

Patent Document

[PATENT DOCUMENT NO. 1] JP-A-2003-309541

Portable type game devices have become popular and users can enjoy games in various environments, such as, on a train, in the open air, or the like. In case of using a wireless headset in order to listen to game sound, a game sound output via the headset is inevitably delayed from a game image displayed on a display of a game device. Games such as, action games, rhythm games, or the like proceed quickly, thus large delay of a game sound from a game image is not preferable. Meanwhile, RPG games or the like proceed rather mildly. Therefore, requirements as to the delay of a game sound from a game image are not so severe. Further, in case that the synchronization between a sound and an image is not required as in the case of music playback applications, the delay of a sound from an image is allowed in most cases.

SUMMARY OF THE INVENTION

In this background, a purpose of the present invention is to provide a technology for adjusting as appropriate a time period from when a voice packet is transmitted wirelessly to when a sound is output.

In order to address the aforementioned issue, a terminal device is provided according to an aspect of the present invention. The terminal device includes: a receiving unit operative to receive one or more voice packets; a jitter buffer operative to accumulate the received one or more voice packets temporarily; a buffer control unit operative to adjust the buffer size of the jitter buffer; an audio decoding unit operative to decode the one or more voice packets, which are output from the jitter buffer; and an instruction receiving unit operative to receive an instruction for setting a sound output mode. The buffer control unit adjusts the buffer size of the jitter buffer in accordance with the setting of the sound output mode instructed in the instruction receiving unit.

According to another aspect of the present invention, an audio output method is provided. The audio output method includes: receiving an instruction for setting a sound output mode; adjusting, in accordance with instructed setting of the sound output mode, the buffer size of a jitter buffer that accumulates one or more voice packets temporarily; receiving one or more voice packets; providing the received one or more voice packets to the jitter buffer of which the buffer size is adjusted; and decoding the one or more voice packets, which are output from the jitter buffer.

According to another aspect of the present invention, an information processing system is provided. The information processing system includes an information processing device operative to output an image to a display and an audio output terminal device operative to receive one or more voice packets transmitted wirelessly from the information processing device and operative to output sound. The information processing device includes: an application processing unit operative to generate an image signal and an audio signal; an image signal processing unit operative to process the generated image signal and operative to allow the display to output an image; an audio signal processing unit operative to process the generated audio signal so as to generate one or more voice packets; and a transmission unit operative to transmit the one or more voice packets. The audio output terminal device includes: a receiving unit operative to receive the one or more voice packets; a jitter buffer operative to accumulate the received one or more voice packets temporarily; a buffer control unit operative to adjust the buffer size of the jitter buffer; an audio decoding unit operative to decode the one or more voice packets, which are output from the jitter buffer; and an instruction receiving unit operative to receive an instruction for setting a sound output mode. The buffer control unit adjusts the buffer size of the jitter buffer in accordance with the setting of the sound output mode instructed in the instruction receiving unit.

Optional combinations of the aforementioned constituting elements, and implementations of the invention in the form of methods, apparatuses, systems, recording mediums, computer programs, or the like may also be practiced as additional modes of the present invention.

DETAILED DESCRIPTION OF THE INVENTION

Figure 1:
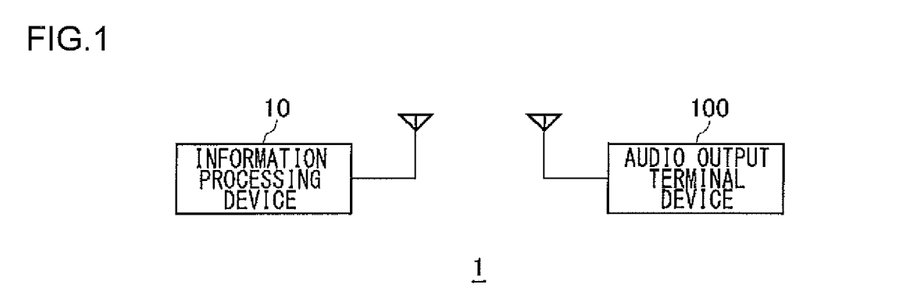
FIG. 1 shows an information processing system according to an exemplary embodiment of the present invention.

FIG. 1 shows an information processing system 1 according to an exemplary embodiment of the present invention. The information processing system 1 comprises an information processing device 10 that executes an application and an audio output terminal device 100 that receives one or more voice packets transmitted wirelessly from the information processing device 10 and outputs sound.

The information processing device 10 executes an application and generates an image signal and an audio signal. For example, the information processing device 10 may execute a game application and may generate a game image signal and a game audio signal. The information processing device 10 is provided with a display, and processes an image signal and outputs an image through the display. Meanwhile, the information processing device 10 converts the audio signal to a voice packet and wirelessly transmits the packet to the audio output terminal device 100. The audio output terminal device 100 may be, for example, a wireless headset, and the device 100 decodes the received voice packet and outputs a sound. The information processing device 10 and the audio output terminal device 100 are connected wirelessly using, for example, the Bluetooth protocol.

Figure 2:
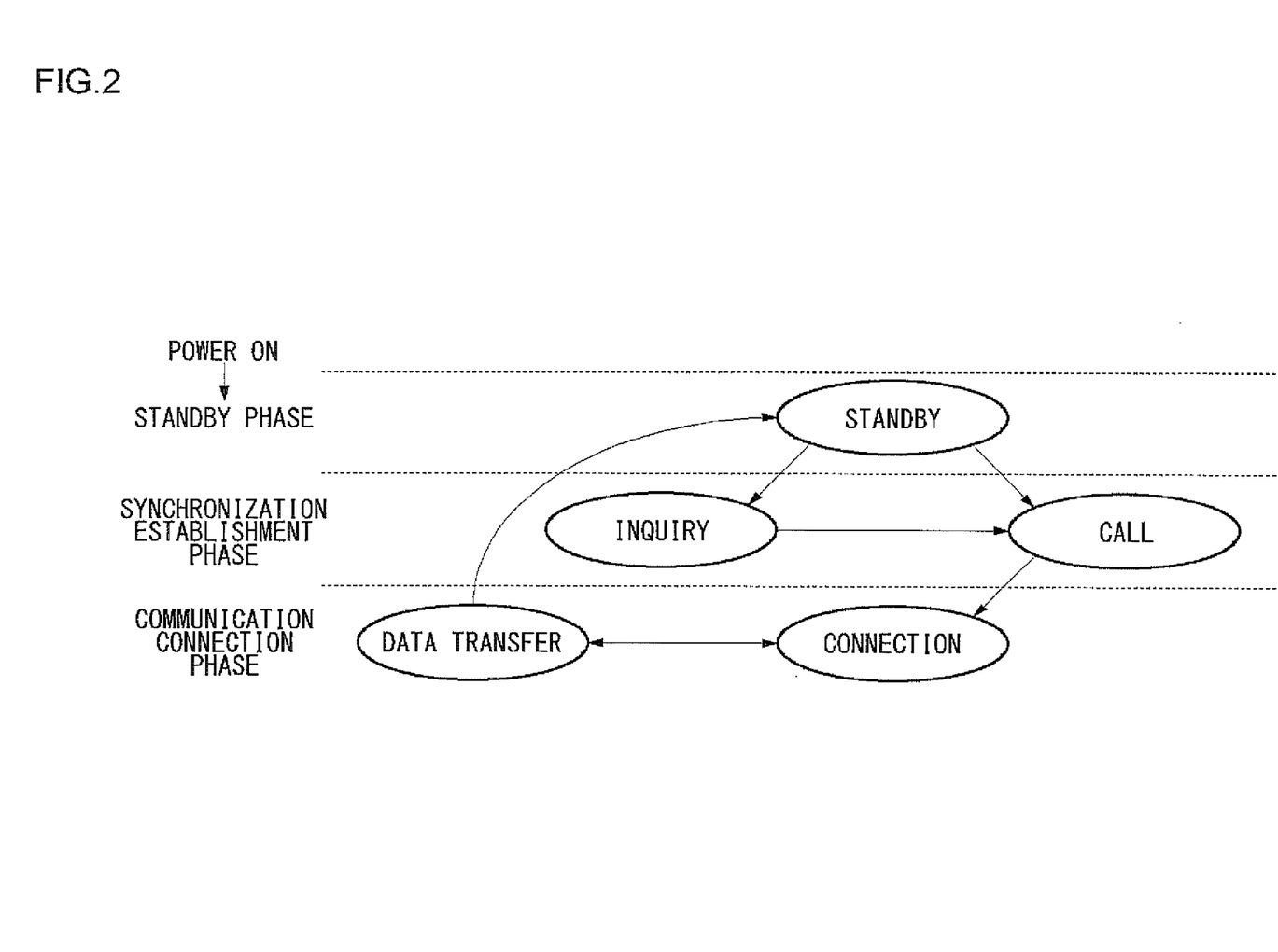
FIG. 2 is a state transition diagram of the Bluetooth.

FIG. 2 shows a state transition diagram of the Bluetooth. As shown in the figure, states of a Bluetooth terminal can be classified into a standby phase, a synchronization establishment phase, and a communication connection phase.

Immediately after power-on of the information processing device 10 and the audio output terminal device 100 or when a communication link is disconnected, the information processing device 10 and the audio output terminal device 100 enter a "standby" state. In the "standby" state, no transmission/reception of data is performed. In the synchronization establishment phase, there exist two states. In one of the states, the information processing device 10 makes a connection query, that is, an "inquiry" to terminal equipments including the audio output terminal device 100 in the periphery. In the other state, the information processing device 10 and the audio output terminal device 100 recognize each other and perform a "call". In the "inquiry" state, the information processing device 10 broadcasts an IQ (inquiry) packet to the terminal equipments in the vicinity. The audio output terminal device 100, which has received the IQ packet, returns an FHS (Frequency Hop Synchronization) packet containing a Bluetooth address and clock information to the information processing device 10.

In case that the information processing device 10 calls the audio output terminal device 100, after the information processing device 10 receives the FHS packet from one or more audio output terminal device 100 so as to recognize which audio output terminal device 100 is present, the information processing device 10 transmits an ID packet to a specific one of the audio output terminal devices 100. When a response to the ID packet is returned from the specific audio output terminal device 100, the information processing device 10 transmits the FHS packet to the audio output terminal device 100 so as to inform the audio output terminal device 100 of the address and the clock of the information processing device 10. As a result, the information processing device 10 and the audio output terminal device 100 can share the same hopping pattern. In case that the audio output terminal device 100 calls the information processing device 10, the entities in the process described above will be exchanged with each other.

Upon the "call," a piconet is formed between the audio output terminal device 100 and the information processing device 10, and the devices enter a "connection" state. The piconet means a network temporarily formed between Bluetooth terminals when the terminals are brought close to each other. Up to eight Bluetooth terminals can participate in a single piconet. In a single piconet, a device that has made a call functions as a parent device (master) so as be able to establish connection with up to seven child devices (slaves). In the "connection" state, a control packet for communication link setting is transmitted and received so as to enable a "data transfer." In the information processing system 1, in case that the audio output terminal device 100 makes a call and functions as a master, the functions of master and slave will be switched between the audio output terminal device 100 and the information processing device 10. The switch sets the information processing device 10 as a master and the audio output terminal device 100 as a slave.

Figure 3:
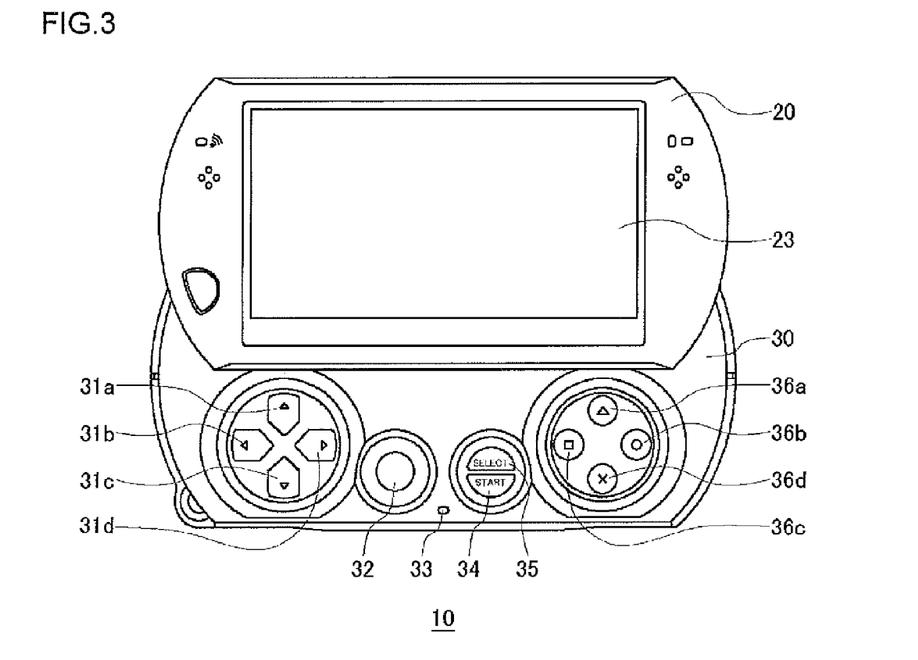
FIG. 3 shows an outward structural appearance of an information processing device according to the exemplary embodiment.

FIG. 3 shows an outward structural appearance of the information processing device 10 according to the exemplary embodiment. The information processing device 10 comprises an upper housing 20 and a lower housing 30 coupled slidably with each other. FIG. 3 shows the information processing device 10 in an open status where the lower housing 30 has slid with respect to the upper housing 20 so that control keys provided on the front face of the lower housing 30 are exposed to the outside.

On the front face of the upper housing 20, a display 23 is provided. Provided on the front face of the lower housing 30 are direction keys 31*a*, 31*b*, 31*c*, and 31*d* (hereinafter referred to as "direction keys 31" when referred collectively), an analogue pad 32, a microphone 33, a start button 34, a select button 35, control buttons 36*a*, 36*b*, 36*c*, and 36*d* (hereinafter referred to as "control buttons 36" when referred collectively).

The information processing device 10 may be a portable type game device. A user sets the information processing device 10 in the open status and executes an game application. The user can manipulate the direction keys 31 and/or the control buttons 36 while holding the information processing device 10 and can enjoy a game. A game image is displayed on the display 23, and game sound is transmitted to the audio output terminal device 100 connected by the Bluetooth protocol.

Figure 4:
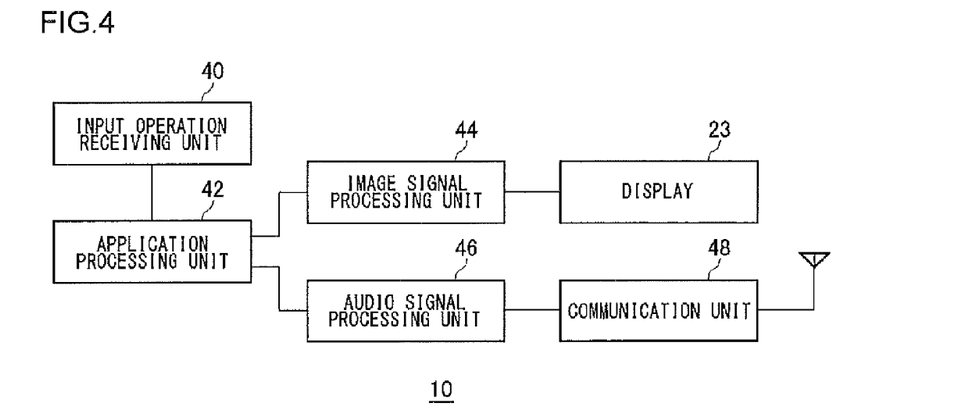
FIG. 4 shows functional blocks of the information processing device.

FIG. 4 shows functional blocks of the information processing device 10. The information processing device 10 comprises an input operation receiving unit 40, an application processing unit 42, an image signal processing unit 44, an audio signal processing unit 46, and a communication unit 48. The input operation receiving unit 40 receives an operation input by a user via a direction key 31 and/or a control button 36. The application processing unit 42 executes a game application, makes a game progress while reflecting an operation input by a user, and generates an image signal and an audio signal of the game. The image signal and the audio signal should originally output as a game image and as a game sound respectively, while being synchronized with each other.

An image signal is provided to the image signal processing unit 44, and the image signal processing unit 44 processes the image signal and allows the display 23 to output an image. An audio signal is provided to the audio signal processing unit 46, and the audio signal processing unit 46 processes the audio signal so as to generate a voice packet. The audio signal processing unit 46 determines the size of the voice packet in accordance with the MTU (Maximum Transmission Unit). The MTU is a value indicating the maximum size of a packet data that the communication unit 48 can transmit by a single data transfer. In the piconet formed between the information processing device 10 and the audio output terminal device 100, if the MTU of the audio output terminal device 100 is smaller than the MTU of the information processing device 10, the audio signal processing unit 46 determines the size of a voice packet in accordance with the MTU of the audio output terminal device 100. The communication unit 48 transmits the voice packet generated by the audio signal processing unit 46 to the audio output terminal device 100.

Figure 5A:
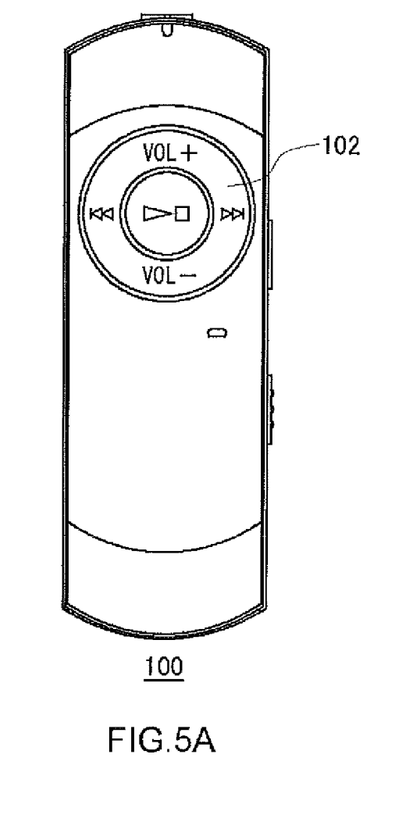
FIGS. 5A-C show an outward structural appearance of an audio output terminal device according to the exemplary embodiment.
Figure 5B:
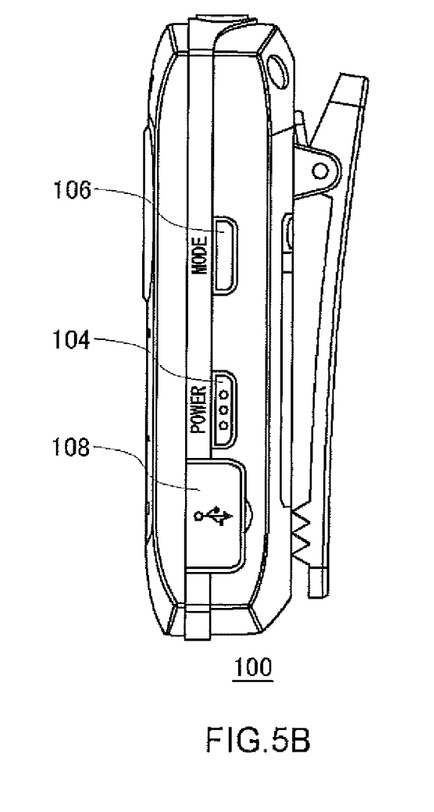
Figure 5C:
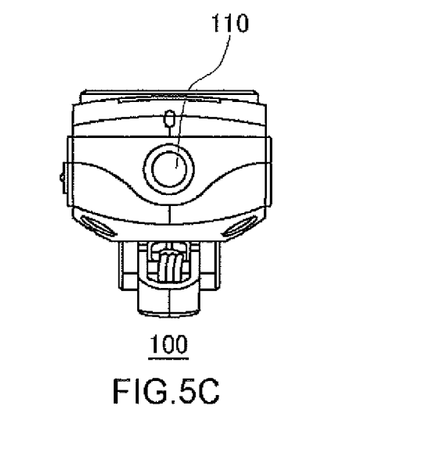

FIGS. 5A-C show an outward structural appearance of the audio output terminal device 100 according to the exemplary embodiment. FIG. 5A is a front view of the audio output terminal device 100. FIG. 5B is a right side view of the audio output terminal device 100. FIG. 5C is a top view of the audio output terminal device 100. The audio output terminal device 100 comprises a control switch 102, a power button 104, a mode shift switch 106, a USB (Universal Serial Bus) jack 108, and a headphone terminal 110. The control switch 102 is manipulated by a user and used in order to adjust the volume of game sound. The mode shift switch 106 is manipulated by a user and used in order to instruct the setting of a sound output mode. The USB jack 108 is provided in order to charge the audio output terminal device 100. By allowing a connector of a USB cable connected to a PC to be plugged into the USB jack 108, the audio output terminal device 100 is charged. Into the headphone terminal 110, the connector of a headphone is plugged.

According to the exemplary embodiment, a user manipulates the mode shift switch 106 and sets one of two modes, a normal mode or a low-delay mode. The normal mode is an audio output mode under normal conditions, and the low-delay mode is an audio output mode that requires lower delay in outputting sound in comparison with the normal mode. The low-delay mode has an advantage that lower delay of output sound is realized, so that the delay of output sound with respect to an output image is reduced. On the other hand, the normal mode has advantages that a possibility of break up of sound is reduced, that power saving effect is high, etc. The user sets an audio output mode in accordance with an application that the user will execute.

Figure 6:
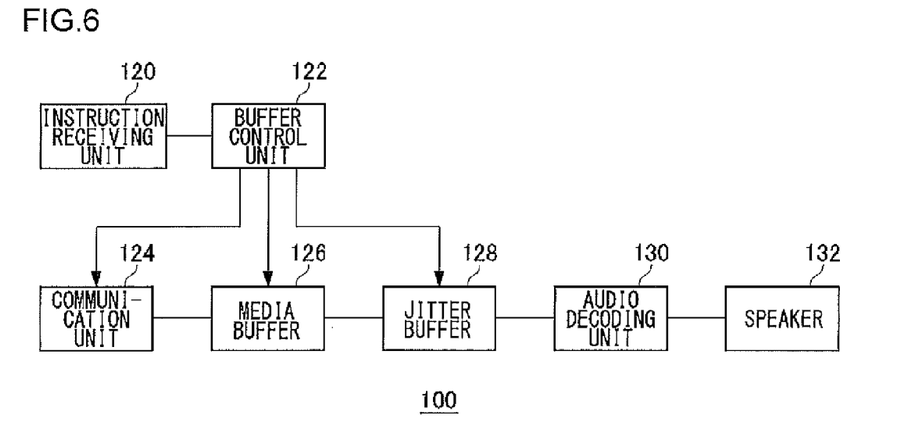
FIG. 6 shows functional blocks of the audio output terminal device.

FIG. 6 shows functional blocks of the audio output terminal device 100. The audio output terminal device 100 comprises an instruction receiving unit 120, a buffer control unit 122, a communication unit 124, a media buffer 126, a jitter buffer 128, an audio decoding unit 130, and a speaker 132.

Functions of the audio output terminal device 100 are implemented by a CPU, memory, a program loaded into the memory, or the like. FIG. 6 depicts functional blocks implemented by cooperation of these components. Therefore, it will be obvious to those skilled in the art that the functional blocks may be implemented in a variety of ways, by hardware only, software only, or a combination thereof.

In a packet communication system, the delay time it takes to transmit a packet varies. Therefore, the fluctuation (jitter) in the transfer delay time substantially affects communication quality in a real time communication. A buffer (jitter buffer) for absorbing the jitter is provided in a receiving terminal that receives a voice packet, as a countermeasure against the jitter. In the receiving terminal, if voice packets are accumulated so as to fill a buffer size that is determined beforehand, voice packets for a predetermined time period are read out by an audio decoding unit and sound is played back. Since the audio output terminal device 100 according to the exemplary embodiment also receives a voice packet transmitted from the information processing device 10 in real time, the device 100 is configured to comprise the jitter buffer 128 for absorbing the jitter. The jitter buffer 128 is a FIFO memory.

The communication unit 124 receives one or more voice packets transmitted from the information processing device 10. The jitter buffer 128 stores one or more voice packets temporarily. Provided between the communication unit 124 and the jitter buffer 128 is the media buffer 126 that temporarily stores the voice packet received by the communication unit 124 and transmits the voice packet to the jitter buffer 128. The buffer control unit 122 manages the media buffer 126 and the jitter buffer 128 and controls the operation thereof, respectively. The audio decoding unit 130 decodes the voice packets for the predetermined time period, the voice packets having been output from the jitter buffer 128, and the speaker 132 outputs sounds.

The media buffer 126 transmits one or more voice packet received by the communication unit 124 to the jitter buffer 128 at predetermined time intervals. This facilitates the buffering process in the jitter buffer 128 and enables the control over setting of the buffer size as a threshold value of voice packets to be output. Since the media buffer 126 is provided for the purpose of transmitting one or more voice packets to the jitter buffer 128 periodically, it is not required to store a lot of voice packets temporarily. Therefore, the size of the media buffer 126 is smaller than the size of the jitter buffer 128. The buffer control unit 122 controls timing for allowing the media buffer 126 to transmit one or more voice packets to the jitter buffer 128. More specifically, the buffer control unit 122 defines a time cycle for allowing the media buffer 126 to transmit one or more voice packets to the jitter buffer 128.

In the audio output terminal device 100 according to the exemplary embodiment, if the amount of voice packets having been transmitted from the media buffer 126 and having been accumulated reaches the buffer size of the jitter buffer 128, voice packets for the predetermined time period are output from the jitter buffer 128 to the audio decoding unit 130. In this manner, the buffer size of the jitter buffer 128 affects the timing for decoding voice packets. Therefore, by reducing the buffer size, the delay with respect to playback of sound can be reduced. Accordingly, the buffer control unit 122 adjusts the buffer size of the jitter buffer 128 in accordance with a sound output mode instructed by a user.

When a user moves the mode shift switch 106, the instruction receiving unit 120 acknowledges the movement of the mode shift switch 106 as an instruction for setting a sound output mode, accordingly. The mode shift switch 106 is moved between a first position and a second position. If the mode shift switch 106 is moved from the first position to the second position, the instruction receiving unit 120 acknowledges an instruction for setting the low-delay mode, and if the mode shift switch 106 is moved from the second position to the first position, the instruction receiving unit 120 acknowledges an instruction for setting the normal mode.

If the instruction receiving unit 120 acknowledges an instruction for setting the normal mode, the buffer control unit 122 defines the buffer size of the jitter buffer 128 as M (words). On the other hand, if the instruction receiving unit 120 acknowledges an instruction for setting the low-delay mode, the buffer control unit 122 defines the buffer size of the jitter buffer 128 as N (words)(N<M). In the low-delay mode, the buffer control unit 122 reduces the buffer size of the jitter buffer 128 in comparison with that of the normal mode.

Figure 7:
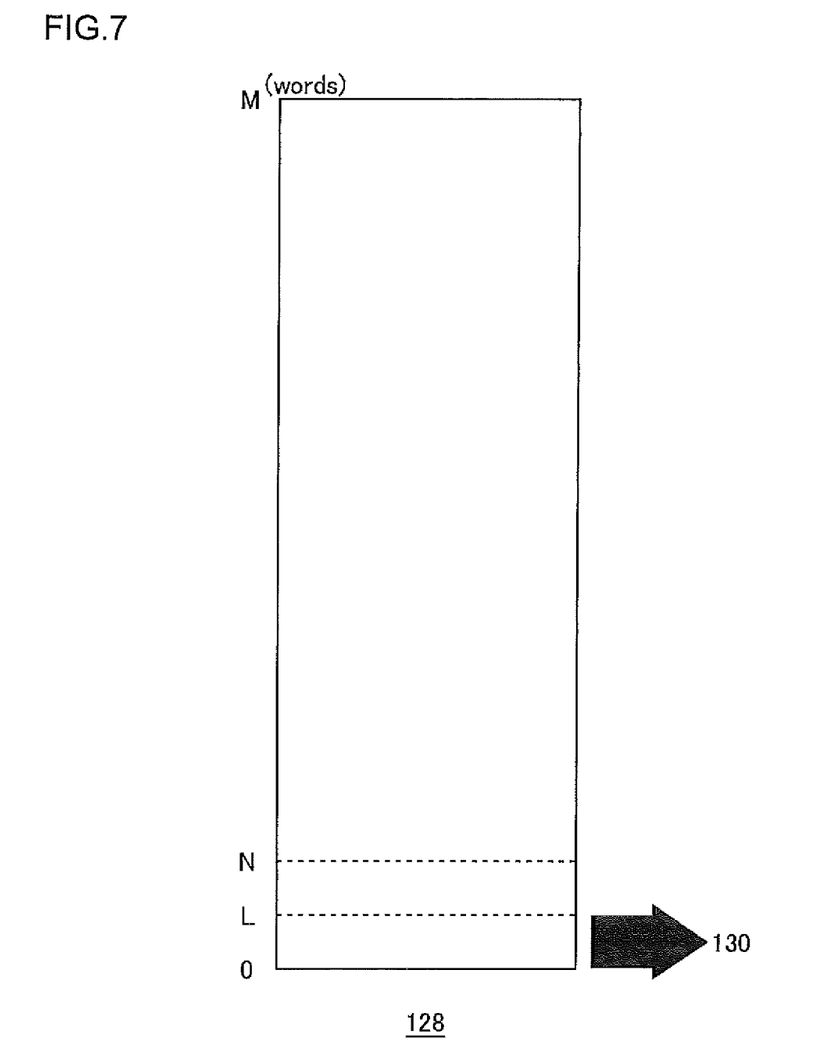
FIG. 7 shows the buffer size of a jitter buffer adjusted by a buffer control unit.

FIG. 7 shows the buffer size of the jitter buffer 128 adjusted by the buffer control unit 122. In the normal mode, the buffer size is defined as M words, and in the low-delay mode, the buffer size is defined as N words. In the audio output terminal device 100 according to the exemplary embodiment, if the accumulated amount of voice packets reaches a certain amount of data specified by the buffer size, voice packets for the predetermined time period (L words of voice packets in the example shown in FIG. 7) are output to the audio decoding unit 130 (L is less than or equal to N). Therefore, in the low-delay mode, by reducing the buffer size of the jitter buffer 128, time required for accumulating (M−N) words of voice packets in the jitter buffer 128 can be omitted in comparison with that in case of the normal mode, which enables sound output with a small delay. Defining the value of N/M as, for example, less than or equal to ¼, sound output with a smaller delay in comparison with that in case of the normal mode can be implemented effectively.

The buffer control unit 122 may control, in accordance with the setting of the sound output mode instructed in the instruction receiving unit 120, timing for allowing the media buffer 126 to transmit one or more voice packets to the jitter buffer 128. If the instruction receiving unit 120 acknowledges an instruction for setting the normal mode, the buffer control unit 122 defines T1 as a time cycle for allowing the media buffer 126 to transmit one or more voice packets to the jitter buffer 128. On the other hand, if the instruction receiving unit 120 acknowledges an instruction for setting the low-delay mode, the buffer control unit 122 defines T2 (T2<T1) as the time cycle for allowing the media buffer 126 to transmit one or more voice packets to the jitter buffer 128. In the low-delay mode, the buffer control unit 122 defines a shorter time period as the time cycle for allowing the media buffer 126 to transmit one or more voice packets in comparison with that of the normal mode.

In the low-delay mode, if a shorter time period is defined for the time cycle for allowing the media buffer 126 to transmit one or more voice packets, a speed for accumulating voice packets in the jitter buffer 128 is increased. Therefore, the amount of voice packets accumulated in the jitter buffer 128 reaches the buffer size at an earlier time point than that of the normal mode. Thus, a time point to output one or more voice packets from the jitter buffer 128 to the audio decoding unit 130 can also be set earlier. This allows sound to be output with a small delay.

The buffer control unit 122 may adjust the MTU in accordance with the setting of the sound output mode instructed in the instruction receiving unit 120. If the instruction receiving unit 120 acknowledges an instruction for setting the normal mode, the buffer control unit 122 defines the MTU as X (byte). Meanwhile, if the instruction receiving unit 120 acknowledges an instruction for setting the low-delay mode, the buffer control unit 122 defines the MTU as Y (byte) (Y<X). In the low-delay mode, the buffer control unit 122 defines a smaller MTU in comparison with that in case of the normal mode.

In the low-delay mode, if a small MTU is defined, the one or more voice packets transmitted from the information processing device 10 to the audio output terminal device 100 arrive at an earlier time point. Therefore, voice packets are accumulated in the jitter buffer 128 to a certain amount at an earlier time point than that of the normal mode. Thus, a time point to output one or more voice packets from the jitter buffer 128 to the audio decoding unit 130 can also be set early. This allows sound to be output with a small delay.

If the MTU is changed, a communication link between the information processing device 10 and the audio output terminal device 100 needs to be redefined. Therefore, in case that the MTU has been changed, the communication link is once disconnected and the communication link between the information processing device 10 and the audio output terminal device 100 is newly defined by using a new MTU. Information on the MTU is transmitted and received between the information processing device 10 and the audio output terminal device 100 upon a "call."

An explanation is given above on the buffer control unit 122 defining the buffer size of the jitter buffer 128, defining the time cycle for allowing the media buffer 126 to transmit one or more voice packets, and defining the MTU, in the low-delay mode. Although it is preferable to define all of these three conditions in order to implement sound output with a smaller delay, only one or two of the conditions may be defined. Even in case that not all three conditions are to be defined, the buffer size of the jitter buffer 128 is preferably defined. In case that a small buffer size is set for the jitter buffer 128, by shortening or reducing the time cycle for allowing the media buffer 126 to transmit one or more voice packets, sound output can be implemented with a small delay, more effectively. The buffer size of the jitter buffer 128 and the time cycle for allowing the media buffer 126 to transmit one or more voice packets can be defined concurrently without redefining a communication link. Therefore, these two conditions may be defined together.

Given above is an explanation based on the exemplary embodiment. The exemplary embodiment is intended to be illustrative only and it will be obvious to those skilled in the art that various modifications to constituting elements and processes could be developed and that such modifications are also within the scope of the present invention.

According to the exemplary embodiment, the information processing device 10 executes an game application. Besides game applications, the information processing device 10 according to the exemplary embodiment can be effectively applied to an application in which an image and music are coupled with each other, that is, an application that has a high requirement for outputting an image and sound in synchronization with each other, for example, an application for playing back an image content (e.g., a movie or the like).

According to the exemplary embodiment, the buffer size of the jitter buffer 128 is defined as N words in the low-delay mode. However, the buffer control unit 122 may allow the buffer size to vary with reference to N words in accordance with a communication environment. Particularly, under a poor communication environment, by defining the buffer size in a range between N words and 2N words, jitter can be absorbed, and concurrently, sound output with a smaller delay in comparison with that of the normal mode can be implemented.

DESCRIPTION OF THE REFERENCE NUMERALS

1 . . . information processing system, 10 . . . information processing device, 40 . . . input operation receiving unit, 42 . . . application processing unit, 44 . . . image signal processing unit, 46 . . . audio signal processing unit, 48 . . . communication unit, 100 . . . audio output terminal device, 102 . . . control switch, 104 . . . power button, 106 . . . mode shift switch, 108 . . . USB jack, 110 . . . headphone terminal, 120 . . . instruction receiving unit, 122 . . . buffer control unit, 124 . . . communication unit, 126 . . . media buffer, 128 . . . jitter buffer, 130 . . . audio decoding unit, 132 . . . speaker.

The present invention is applicable to audio output technology.

The invention claimed is:
1. A terminal device comprising:
a receiving unit operative to receive one or more voice packets;
a jitter buffer operative to accumulate the received one or more voice packets temporarily;
a buffer control unit operative to adjust the buffer size of the jitter buffer;
a media buffer, provided between the receiving unit and the jitter buffer, operative to temporarily accumulate the one or more voice packets received by the receiving unit and to transmit the one or more voice packets to the jitter buffer;

an audio decoding unit operative to decode the one or more voice packets, which are output from the jitter buffer; and an instruction receiving unit operative to receive an instruction for setting a sound output mode, wherein the buffer control unit adjusts the buffer size of the jitter buffer and a timing for allowing the media buffer to transmit the one or more voice packets to the jitter buffer in accordance with the setting of the sound output mode instructed in the instruction receiving unit.

2. The terminal device according to claim 1, wherein, if the instruction receiving unit receives the instruction for setting the sound output mode that requires low-delay in outputting sound, the buffer control unit reduces the buffer size of the jitter buffer.

3. The terminal device according to claim 1, wherein if the instruction receiving unit receives the instruction for setting the sound output mode that requires low-delay in outputting sound, the buffer control unit shortens a time cycle for transmitting the one or more voice packets to the jitter buffer.

4. The terminal device according to claim 1, wherein if the instruction receiving unit receives the instruction for setting the sound output mode that requires low-delay in outputting sound, the maximum size of a packet data unit that can be transmitted by one data transfer (MTU) is reduced.

5. An audio output method comprising:
receiving an instruction for setting a sound output mode;
receiving one or more voice packets in a receiving unit;
temporarily accumulating the one or more voice packets received by the receiving unit in a media buffer;
transmitting the one or more voice packets from the media buffer to the jitter buffer and accumulating the one or more voice packets in the jitter buffer;
adjusting, in accordance with instructed setting of the sound output mode: (i) a buffer size of the jitter buffer that accumulates the one or more voice packets, and (ii) a timing of transmitting the one or more voice packets from the media buffer to the jitter buffer; and
decoding the one or more voice packets, which are output from the jitter buffer.

6. A computer program embedded on a non-transitory computer-readable recording medium, comprising:
a module configured to receive an instruction for setting a sound output mode;
a module configured to receive one or more voice packets in a receiving unit;
a module configured to temporarily accumulate the one or more voice packets received by the receiving unit in a media buffer;
a module configured to adjust, in accordance with instructed setting of the sound output mode: (i) a buffer size of the jitter buffer that accumulates the one or more voice packets, and (ii) a timing of transmitting the one or more voice packets from the media buffer to the jitter buffer; and
a module configured to decode the one or more voice packets, which are output from the jitter buffer.

7. An information processing system comprising an information processing device operative to output an image to a display and an audio output terminal device operative to receive one or more voice packets transmitted wirelessly from the information processing device and operative to output sound, wherein
the information processing device comprises:
an application processing unit operative to generate an image signal and an audio signal;
an image signal processing unit operative to process the generated image signal and operative to allow the display to output an image;
an audio signal processing unit operative to process the generated audio signal so as to generate one or more voice packets; and
a transmission unit operative to transmit the one or more voice packets, and the audio output terminal device comprises:
a receiving unit operative to receive the one or more voice packets;
a jitter buffer operative to accumulate the received one or more voice packets temporarily;
a buffer control unit operative to adjust the buffer size of the jitter buffer;
a media buffer, provided between the receiving unit and the jitter buffer, operative to temporarily accumulate the one or more voice packets received by the receiving unit and to transmit the one or more voice packets to the jitter buffer;
an audio decoding unit operative to decode the one or more voice packets, which are output from the jitter buffer; and
an instruction receiving unit operative to receive an instruction for setting a sound output mode,
wherein the buffer control unit adjusts the buffer size of the jitter buffer and a timing for allowing the media buffer to transmit the one or more voice packets to the jitter buffer in accordance with the setting of the sound output mode instructed in the instruction receiving unit.

* * * * *